United States Patent
Yuan et al.

(10) Patent No.: US 7,304,826 B2
(45) Date of Patent: Dec. 4, 2007

(54) FAULT MANAGEMENT OF HIGH TEMPERTURE SUPERCONDUCTOR CABLE

(75) Inventors: Jie Yuan, South Grafton, MA (US); James F. MaGuire, Andover, MA (US); Arnaud Allais, Hannover (DE); Frank Schmidt, Langenhagen (DE)

(73) Assignees: American Superconductor Corporation, Westborough, MA (US); Nexans, Paris (FR)

( * ) Notice: Subject to any disclaimer, the term of this patent is extended or adjusted under 35 U.S.C. 154(b) by 0 days.

(21) Appl. No.: 11/459,167

(22) Filed: Jul. 21, 2006

(65) Prior Publication Data

US 2007/0093977 A1    Apr. 26, 2007

Related U.S. Application Data

(60) Provisional application No. 60/703,855, filed on Jul. 29, 2005.

(51) Int. Cl.
*H02H 7/00* (2006.01)
*H02H 3/00* (2006.01)

(52) U.S. Cl. ............................ 361/19; 361/62; 361/63; 361/65; 700/58

(58) Field of Classification Search .................. 361/19, 361/62, 63, 65; 700/58
See application file for complete search history.

(56) References Cited

U.S. PATENT DOCUMENTS

| | | | |
|---|---|---|---|
| 4,370,609 A * | 1/1983 | Wilson et al. | 324/522 |
| 4,375,659 A * | 3/1983 | Cunningham et al. | 361/19 |
| 5,943,204 A * | 8/1999 | Jones et al. | 361/93.2 |
| 6,453,248 B1 * | 9/2002 | Hart et al. | 702/58 |
| 7,135,988 B2 * | 11/2006 | Kawai et al. | 340/870.17 |
| 2002/0105231 A1 * | 8/2002 | Koeppe et al. | 307/64 |
| 2003/0183410 A1 * | 10/2003 | Sinha et al. | 174/68.1 |
| 2006/0125421 A1 * | 6/2006 | Costa | 315/294 |

* cited by examiner

*Primary Examiner*—Michael Sherry
*Assistant Examiner*—Tien Mai
(74) *Attorney, Agent, or Firm*—Occhiuti Rohlicek & Tsao LLP

(57) ABSTRACT

A method and system for providing protection for a superconducting electrical cable located in a utility power network includes detecting a fault current on the superconducting electric cable, determining the cumulative total energy dissipated in the superconducting electrical cable from the fault current and at least one prior fault current over a predetermined time period, and determining whether to disconnect the superconducting electrical cable from the utility power network on the basis of the cumulative total energy dissipated.

18 Claims, 5 Drawing Sheets

FAULT MANAGEMENT OF HIGH TEMPERTURE SUPERCONDUCTOR CABLE

RELATED APPLICATION

Under 35 U.S.C. §119(e)(1), this application claims the benefit of prior U.S. provisional application 60/703,855, filed Jul. 29, 2005.

GOVERNMENT RIGHTS

This invention was made with U.S. government support under Contract No.; DE-FC36-03G013032. The Government may have certain rights in the subject invention.

BACKGROUND OF THE INVENTION

Problems in a utility network, or "faults", (such as network device failures) can affect how power is distributed throughout the network. In particular, faults tend to drain energy from power sources, leaving less energy for distribution throughout other areas of the network and for recovering from voltage "sags" resulting from the fault.

When a fault occurs in a utility network, momentary voltage depressions are experienced, which may result in voltage collapse or voltage instability on the network.

In general, such a fault appears as an extremely large load materializing instantly on the utility network. In response to the appearance of this load, the network attempts to deliver a large amount of current to the load (i.e., the fault). Detector circuits associated with circuit breakers on the network detect the over-current situation immediately (within a few milliseconds). Activation signals from the detector circuits are sent to protective relays which initiate opening of the circuit. The mechanical nature of the relays generally requires 3 to 6 cycles (i.e., up to 100 milliseconds) to open. When the breakers open, the fault is cleared.

Power cables using high temperature superconductor (HTS) wire are being developed to increase the power capacity in utility power networks while maintaining a relatively small footprint. Among other advantages, the HTS power cables are much easier to site, even in dense, older urban areas. Such HTS cables also allow larger amounts of power to be pumped economically and reliably into congested areas of a utility power network and transferred precisely where it is needed to relieve congestion. An HTS power cable uses HTS wire in the core of the cable instead of copper for the transmission and distribution of electricity. The design of HTS cables results in significantly lower impedance compared to conventional lines and cables. The use of HTS wire enables a three to five times increase in current-carrying capability compared to alternating current (AC) conventional cables, and up to ten times more power flow through direct current (DC) conventional cables.

HTS power cables behave differently than conventional non-superconducting cables to fault currents. First, a cold dielectric HTS power cable requires that the cooling liquid must remain in a sub-cooled state during a major fault or multiple through faults. This is necessary to maintain the dielectric strength between the high voltage cable core and the shield, which is at ground potential. Any bubble formation inside dielectric will threaten the dielectric properties of the insulation. Second, the cable must be off line following major faults in order to allow enough time for the HTS conductors to be cooled back down to the operating temperature range. As a result, conventional cable fault protection schemes are not suitable for use with HTS power cables.

SUMMARY OF THE INVENTION

In a general aspect of the invention, a method of providing protection for a superconducting electrical cable located in a utility power network includes the following steps. A fault current is detected on the superconducting electric cable. The cumulative total energy dissipated (or stored) in the superconducting electrical cable is determined from the fault current and at least one prior fault current over a predetermined time period. A determination as to whether to disconnect the superconducting electrical cable from the utility power network on the basis of said cumulative total energy dissipated (or stored) is made.

Embodiments of the aspect of the invention may include one or more of the following features. The step of detecting includes determining the magnitude of the fault current $I_j$ and a time duration of the fault current $t_{dj}$ on the superconducting electrical cable. The method further includes determining if the fault current $I_j$ exceeds a predetermined threshold current level and, if it does, disconnecting the superconducting electrical cable from the utility power network for a time period based on the level of the fault current $I_j$.

The time period is based on the geometry of the superconducting electrical cable and the associated cooling system. For example, the geometry of the superconducting electrical cable includes a plurality of layers and the time period is based on $A_j$ is cross section area of layer j, $k_j$ is the conductivity of layer j, $T_j$ is local temperature of layer j which is a function of position and time, $R_{jj-1}$ is the thermal resistance between layer j−1 and layer j, $R_{jj+1}$ is the thermal resistance between layer j and j+1, $\rho_i$ is the density of the layer j, $C_j$ is specific heat of layer j, and m is coolant flow rate.

The method further includes determining the time elapsed between the fault current $I_j$ and a prior fault current $I_{j-1}$ when $I_j$ does not exceed a predetermined threshold current level and determining if the time elapsed exceeds a predetermined threshold time period and if it does, maintaining the connection of the superconducting electrical cable in the utility power network. Determining the cumulative total energy value includes determining whether the cumulative total energy value is less than a critical threshold value that represents the amount of energy at which the cable would be damaged if a major fault occurs in a time period that is short than a predetermined threshold time period. In another aspect of the invention, a system for providing protection for a superconducting electrical cable located in a utility power network, includes a sensor configured to detect a fault current carried on the superconducting electrical cable; a controller configured to determine the cumulative total energy dissipated in the superconducting electrical cable from the fault current and at least one prior fault current over a predetermined time period; and configured to determine whether to disconnect the superconducting electrical cable from the utility power network on the basis of said cumulative total energy dissipated.

Embodiments of this aspect of the invention may include one or more of the following features. The controller determines the magnitude of the fault current $I_j$ and a time duration of the fault current $t_{dj}$ on the superconducting electrical cable. The controller determines if the fault current $I_j$ exceeds a predetermined threshold current level and if it does disconnects the superconducting electrical cable from the utility power network for a time period based on the level of the fault current $I_j$. The time period is based on the geometry of the superconducting electrical cable and associated cooling system. The controller determines the time elapsed between the fault current $I_j$ and a prior fault current $I_{j-1}$ and determines if the time elapsed exceeds a predetermined threshold time period and if it does, maintaining the connection of the superconducting electrical cable in the utility power network.

Among other advantages, the method and system described above provides over-current protection of superconducting electrical cables by monitoring the current flowing in a portion of a power network to which the power cable is connected. The method and system accounts for an occurring fault as well as previously occurring faults, even those that do not rise to the level of requiring immediate interruption of current through the cable (i.e., activating a circuit breaker) but nevertheless cause heating of the superconductor in the cable. By doing so, the cumulative heating effects due to previous faults are accounted for when a fault occurs. For example, a fault having a current magnitude and duration that would normally not trip a circuit breaker, might generate sufficient heat to be damaging to the superconductor cable in conjunction with heating from other recently occurring faults. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
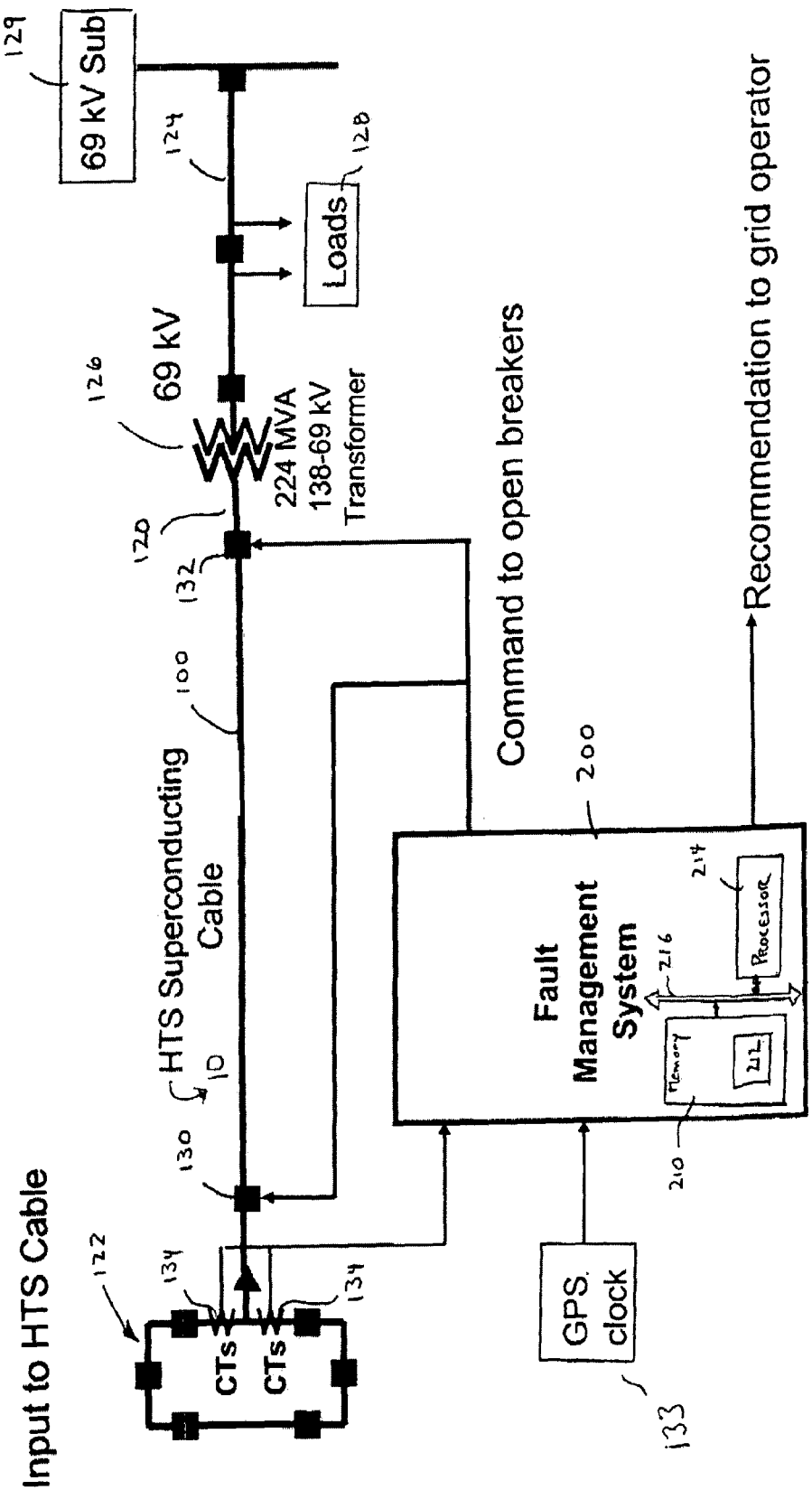
FIG. 1 is a schematic diagram illustrating a fault management system for providing over-current protection to an HTS cable.

Referring to FIG. 1, a high temperature superconductor (HTS) cable 100 is shown connected within a portion of a utility power grid 10. HTS cable 100 has a length here of several hundred meters and provides a relatively high current and low resistance electrical path while occupying a fraction of the space required by a conventional copper cable carrying the same amount of current. As will be discussed in greater detail below, HTS wire used in HTS cable 100 has a design and structure capable of carrying as much as 150 time the electrical current of similar sized copper wire. With a relatively small amount of HTS wire rather than large quantities of copper stranded into the core of an AC cable, three to five times more power can be carried through an equivalent sized line.

Figure 2:
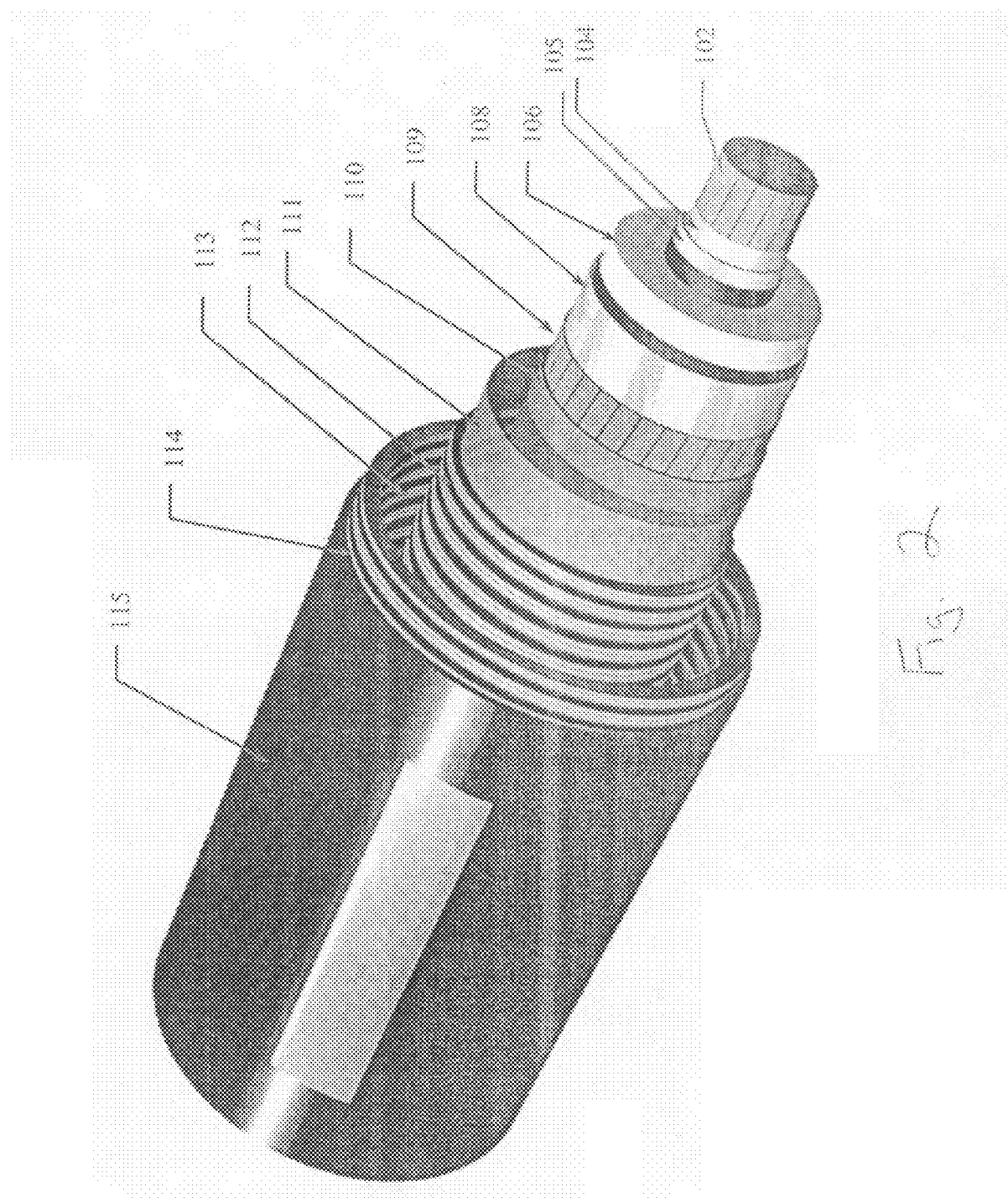
FIG. 2 is a isometric view of an HTS cable.

Referring to FIG. 2, HTS cable 100 includes a strand copper core 102 surrounded in radial succession by a first high temperature superconductor layer 104, a second high temperature superconductor layer 105, a high voltage insulation layer 106, a high temperature superconductor shield layer 108, an outer copper shield layer 109, a protection layer 110, a coolant envelope 111, an inner cryostat wall 112, a vacuum space 113, an outer cryostat wall 114 and an outer cable sheath 115. In operation, a refrigerant (e.g., liquid nitrogen) is supplied from an external coolant source (not shown) to circulate inside and along the length of coolant envelop 111. This type of HTS power cable is available from Nexans, Paris France. Other companies such as Sumitomo Electric Industries, Ltd., Osaka, Japan and Ultera™ a joint venture of Southwire Company of Carrollton, Ga. and nkt cables, Asnaes Denmark also produce HTS power cables.

Referring again to FIG. 1, HTS cable 100 is connected within a transmission grid segment 120 that carries voltages at a level of about 138 kV and extends from grid segment 122 to grid segment 124 which carries voltages at a lower level of about 69 kV. A step-down transformer 126 drops the voltage from the 138 kV transmission line voltage to the lower 69 kV transmission line voltage. In this particular application, transmission grid segment 124 feeds a number of leads 128 as well as a substation 129, A pair of circuit breakers 130, 132 are connected at each end of HTS cable 100 to allow the HTS cable to be quickly disconnected from the utility power grid.

A fault management system 200 provides over-current protection to HTS cable 100 by ensuring that HTS cable 100 is maintained below a temperature where the cable could be subjected to damage. Fault management system 200 provides such over-current protection by monitoring the current flowing in the segment of the utility grid to which HTS cable 100 is connected. In particular, fault management system 200 senses the current from a pair of current transformers 134 at one end of HTS cable 100. Fault management system includes a memory 210 including at least a portion for storing a computer program 212 for controlling circuit breakers 130, 132, a processor 214 to execute the computer-readable instructions, and a bus 216 connecting the memory to the processor. Fault management system also includes a standard GPS clock 133 to determine both the fault duration and the time between the faults. Specifically, the GPS clock provides a time stamp for processor 214 in establishing the fault duration and the time between the faults. The stored program includes computer-readable instructions which, on the basis of the signals detected at transformers 134 and the standard GPS clock, provide control signals to circuit breakers 130, 132 to disconnect HTS cable from transmission line 120.

Figure 3:
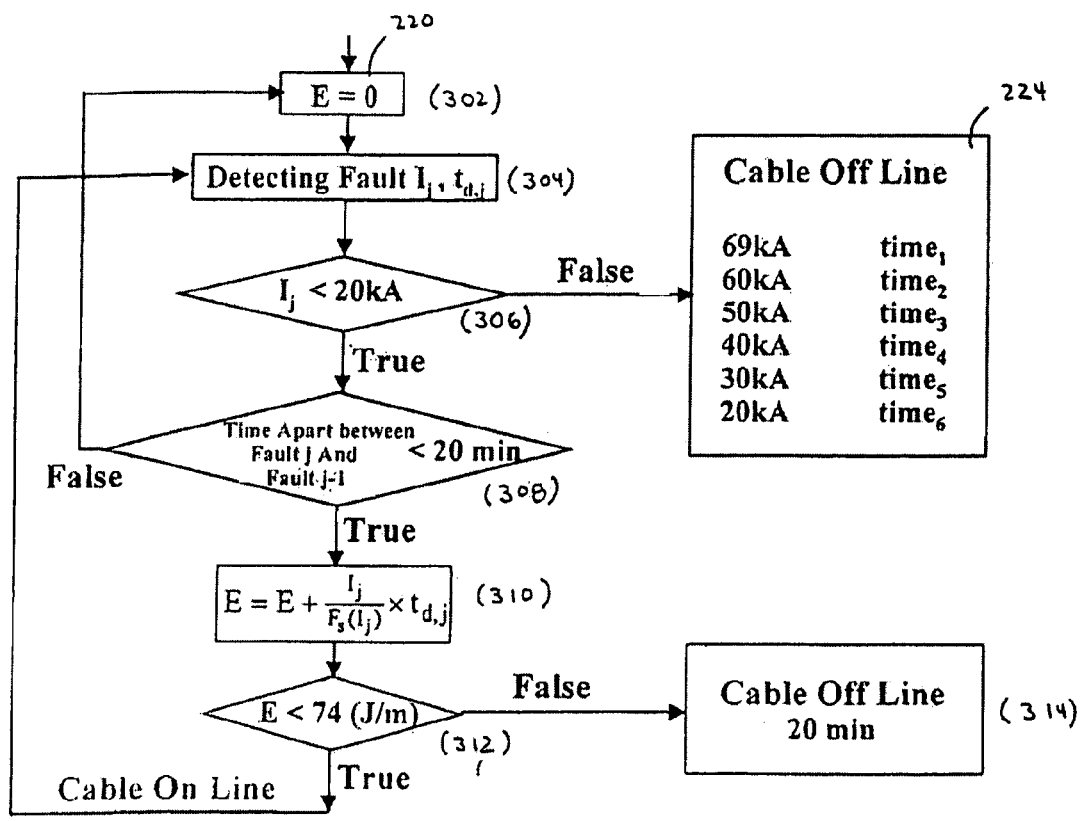
FIG. 3 is a flow diagram showing the operation of the fault management system.

With reference to FIG. 3, the operation of fault management system 200 will be described in conjunction with HTS cable 100 having a structure as shown in FIG. 2. In this example, HTS cable 100 is designed to withstand a fault current as high as 69 kA fault current with a duration of 200 ms (12 cycle) assuming that the HTS cable was not subjected to more than the predetermined allowable through-fault limits by which the temperature rise of HTS layer 105 is higher than the allowable temperature margin. It should be understood that this invention is generally applicable to HTS power cables and the specific parameters used in this example are for this particular cable design and a particular transmission grid configuration. The parameters needed to practice this invention for a given cable design and grid will be readily determined by those skilled in the art.

In operation, fault management system 200 includes an energy register 220 for storing the value of the total energy per length expected to be dissipated by HTS cable (step 302) at its most vulnerable location (typically at the end of the cable where the coolant has the highest temperature). Fault management system continuously monitors the level of current at current transformers 134 within a time window provided by the GPS clock signal. If the current in this window exceeds the normal operating current a time stamp is issued when the current exceeds the normal level and when it returns to the normal level. This allows the fault management system to determine the total time of the particular fault, (step 304). In this embodiment, a fault current greater than 69 kA would cause the temperature of superconducting layer 105 to exceed the saturated temperature of the coolant, thereby possibly causing permanent damage in the cable due to formation of bubbles within high voltage insulation layer 106. However, even if the current level is less than 69 kA but above a predetermined threshold current level for a particular cable/grid (in this example 20 KA), HTS cable 100 could be susceptible to damage if the level of current carried by the cable and time duration of the fault were significant enough to raise its temperature without sufficient time for the cable to cool to a level at which it can withstand a fault current at the 69 kA level. Thus, fault management system 200 determines whether the monitored current is less than 20 kA (step 306). If it is greater than 20 kA, fault management system 200 refers to a cable off-line timetable 224 to establish a time period necessary for HTS cable to cool without regard to a subsequent fault. The cable is then taken off line for the determined time period by sending a signal to the breakers commanding them to open.

For this particular example, HTS cable uses a cable off-line timetable lookup table as follows:

| Current (kA) | Approximate Time (hours) |
|---|---|
| 69 | 8 |
| 60 | 5.8 |
| 50 | 3.8 |
| 40 | 2.3 |
| 30 | 1.2 |
| 20 | 0.5 |

The approximate time values for the cable off-line timetable are generated from cable energy balance equations.

$$A_j k_j \frac{d^2 T_j}{dx^2} + \frac{(T_{j-1} - T_j)}{R_{i,j-1}} - \frac{(T_j - T_{j+1})}{R_{i,j+1}} = \rho_j C_j A_j \frac{dT_j}{dt} \quad (1)$$

where $A_j$ is cross section area of layer j, $k_j$ is the conductivity of layer j, $T_j$ is local temperature of layer j which is a function of position and time, $R_{jj-1}$ is the thermal resistance between layer j−1 and layer j, $R_{jj+1}$ is the thermal resistance between layer j and j+1, $\rho_j$ is the density of the layer j, $C_j$ is specific heat of layer j The stored energy within HTS cable 100 due to a fault has to be removed before the cable can be re-energized. The time duration to cool HTS cable 100 back down to a normal operating mode depends on several factors. These factors include available cooling power, coolant flow rate as well as the total energy dissipated within the cable during a fault. The more energy stored inside the cable, the longer the time required to cool the cable will be. To calculate the time duration for cool down, a transient thermal model is necessary. The calculated results of the time duration of each fault shown above can be used by a cable operator to determine how long the cable has to be off-line for a given fault current.

If the monitored current is less than 20 kA, the cable may not have to be taken off line immediately. Thus, fault management system 200 then determines whether the time between a previous fault is less than a predetermined time threshold, here 20 minutes (step 308). If the time between faults is greater than 20 minutes the energy per length value stored in the energy register is reset to a zero value as if there had not been a previous fault due to cool back down effect. If the time between fault has been less than twenty minutes, fault management system assumes that HTS cable 100 continues to have some level of stored energy per length. Fault management system 200 uses an algorithm to determine the level of that stored energy (step 310):

$$E_j = \Sigma E_{j-1} + (I_j/F_s)^* t_{d,j}$$

where; $E_j$ is the stored energy per unit length (J/m)
$E_{j-1}$ is the stored energy per unit length from the previous fault (J/m)
$I_j$ is the magnitude of the fault current
$F_s$ is a current sharing factor (A*sec*m/J)
$t_{dj}$ is the duration of the fault (seconds)

Note that the above equation includes a current sharing factor $F_s$ which is dependent on a number of factors. The Current Sharing Factor Table is generated by modeling various fault conditions and finding the correlation between the energy dissipated at certain HTS layer and a given fault current and fault duration. As described above, HTS cable 100 consists of several layers. During a fault condition, the current will be distributed among superconductor layers 104, 105, 108, former 112 and copper shield 114 based on the cable configuration. Due to the geometry and design of the cable, the temperature of superconductor layer 105 will be higher than that of superconductor layer 104 and, therefore, damage caused by any formation of a bubble will be most likely near this layer. Thus, superconductor layer 105 is used as the critical layer in ensuring that HTS cable 100 is protected from damage. For the particular HTS cable 100 shown in FIG. 2, a current sharing factor table associating fault current levels with current sharing factors is as follows:

| Current (kA) | $F_s$ (Asm/J) |
|---|---|
| 1 | 554700 |
| 2 | 5371 |
| 3 | 667 |
| 4 | 329 |
| 5 | 95 |
| 6 | 57 |
| 7 | 43 |
| 8 | 36 |
| 9 | 32 |
| 10 | 30 |

Figure 4B:
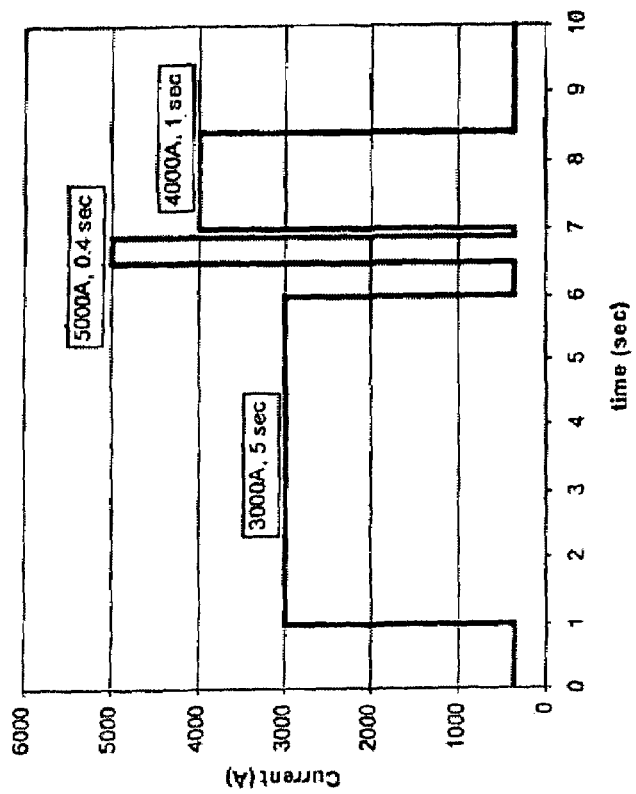
FIGS. 4A and 4B are graphs illustrating current as a function of time and HTS temperature as a function of time, respectively, for a first series of fault events.
Figure 4A:
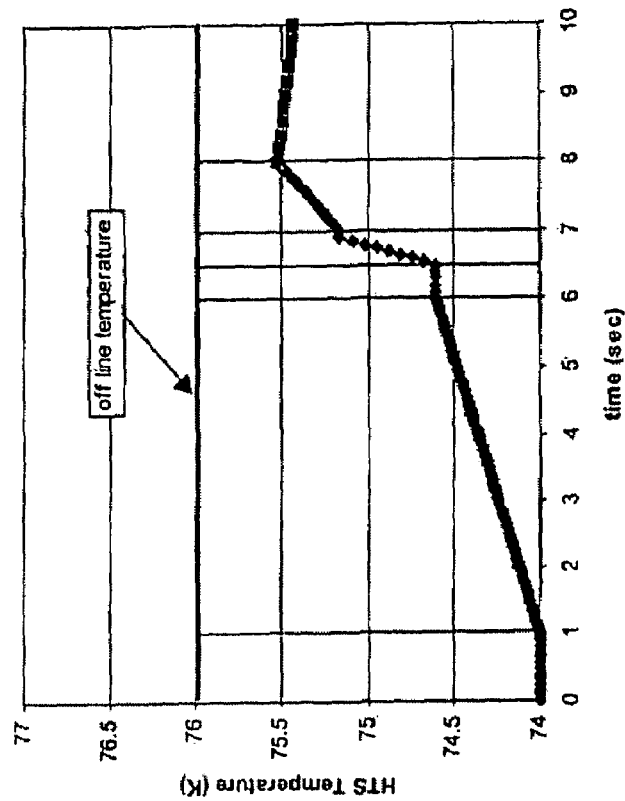

Once the stored energy per unit length $E_j$ is calculated using the algorithm shown above it is compared with a predetermined energy per unit length threshold, here 74 J/meter. If the energy per unit length threshold is less than 74 J/meter in this example, HTS cable 100 remains connected within transmission segment 120. If it greater than 74 J/meter HTS cable 100 is disconnected from transmission segment 120 for 20 minutes before being reconnected. The time duration of 20 min is the minimum requirement of removing the stored energy from the cable 100 and is based on the refrigeration system design. To better understand the operation of fault management system 200, reference is made to FIGS. 4A-4B and FIGS. 5A-5B. With the first fault protection example, FIG. 4A shows the fault current levels of three successive fault current events as a function of time while FIG. 4B shows the corresponding temperature of superconductor layer 105 within HTS cable 100 as a function of time. At time=0, HTS cable 100 is carrying a current level of approximately 300 A (FIG. 4A) and the highest temperature of the cable is approximately 74 K (FIG. 4B). One second later t=1 sec), a 3 kA fault current lasting five seconds occurs. As shown in FIG. 4B, during the five seconds, the temperature of the HTS cable steadily rises to about 74.6 K. When the fault clears at t=6 seconds, the current level drops immediately to the normal operating current of 300 A. However, the temperature of the cable only drops slightly when the second of the three faults occurs at t=6.5 seconds. As shown in FIG. 4A, the second fault is a 5 kA fault and lasts 0.4 seconds and as shown in FIG. 4B, the temperature of HTS cable 100 increases relatively rapidly to about 75.2 K. At t=7 seconds, the final fault current event occurs, a 4 kA fault lasts for 1 second before returning to normal current conditions. Once again, as shown in FIG. 4B, the temperature of the cable rises once again to about 75.5 K, which is still below the predetermined 76 K off-line threshold. The temperature of the HTS cable is related to the energy by following equation $$E = \int_{T_{init}}^{T_f} \rho A C_p dT,$$

where E is the energy per length dissipated to HTS layer 105, $T_{init}$ is the initial temperature, $T_f$ is the final temperature of HTS layer 105, $\rho$ is HTS wire density, A is HTS wire sectional area) Therefore, in this first example, the particular combination of fault current events was not sufficient to cause the fault management system 200 to remove HTS cable 100 from transmission line 120. This means even if there is a major 69 KA fault just after 4 kA fault, the cable will not be damaged.

Figure 5B:
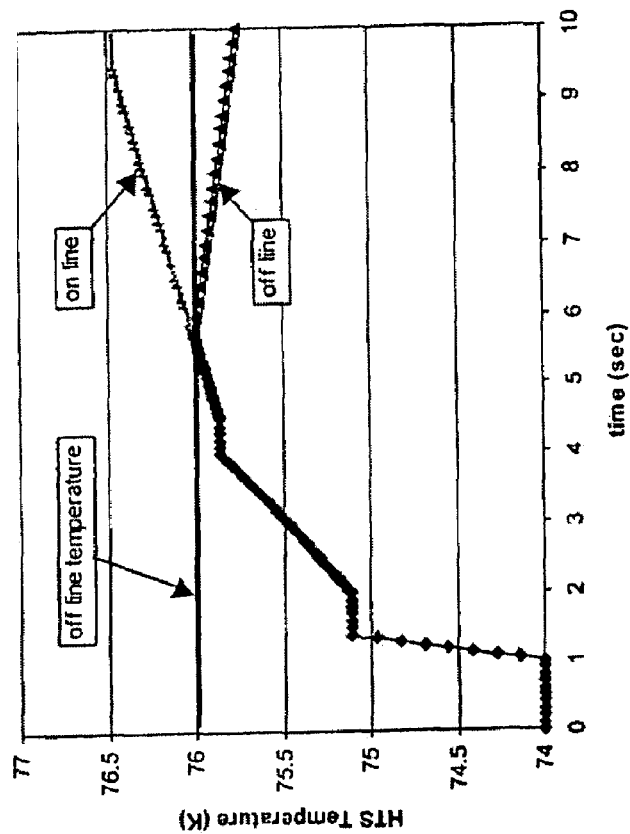
FIGS. 5A and 5B are graphs illustrating current as a function of time and HTS temperature as a function of time, respectively, for a second series of fault events.
Figure 5A:
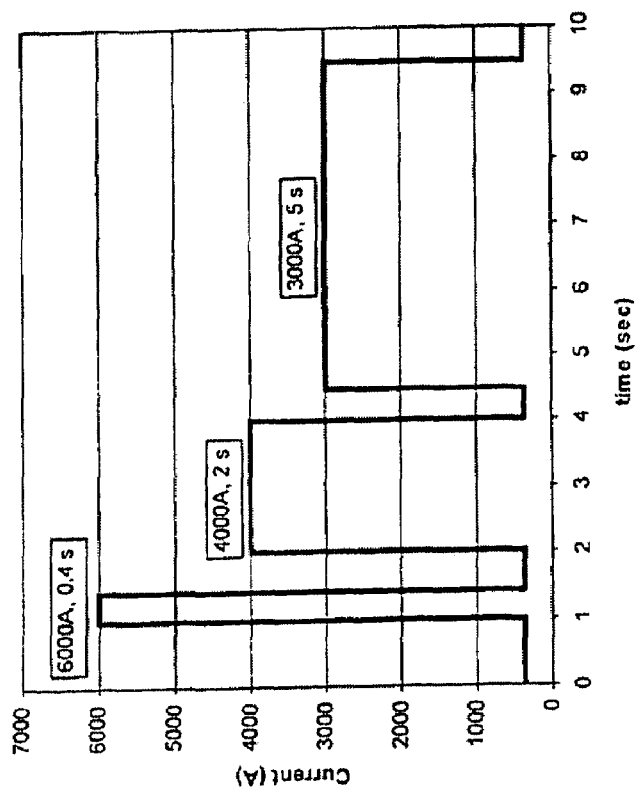

Referring now to FIGS. 5A and 5B, in a second fault protection example, at time=0, HTS cable 100 is carrying a current level of approximately 300 A (FIG. 5A) and the temperature of the cable is approximately 74 K (FIG. 5B). One second later (t=1), a 6 kA fault lasting 0.4 seconds occurs. As shown in FIG. 5B, during the five seconds, the temperature of the HTS cable rapidly rises to about 75.2 K. When the fault clears at t=1.5 seconds, the current level drops immediately to the normal operating current of 300 A. However, the temperature of the cable drops very little when the second of the three faults occurs at t=2 seconds. As shown in FIG. 5A, the second fault is a 4 kA fault and lasts 2 seconds and us shown in FIG. 4B, the temperature of HTS cable 100 increases relatively steadily to about 75.8 K. At t=4.5 seconds, the final fault current event in which a 3 kA fault lasts for 5 second before returning to normal current conditions. Not that the temperature of HTS cable 100 remains relatively high at the time of the third fault current event. As shown in FIG. 5B, at about t=5.5 seconds, the temperature of the cable is seen to exceed the off-line temperature of 76 K. Thus, unlike the example shown in FIGS. 4A and 4B, fault management system 200 sends control signals to circuit breakers 130, 132 to disconnect HTS cable 100 from transmission line 120. If the cable remains on line, a major fault of 69 kA just after 3 kA fault could possibly cause damage to the cable 100.

A number of embodiments of the invention have been described. Nevertheless, it will be understood that various modifications may be made without departing from the spirit and scope of the invention. For example, it is important to appreciate that values described above for the level of over-current protection depend on the particular design and structure of the HTS cable and how and where it is used within the utility power grid. Therefore, the values for the current and approximate cooling periods shown in the cable off-line table as the values for current sharing factors table are determined on the basis of the design of the HTS cable as well as its application in a utility power network.

What is claimed is:

1. A method of providing protection for a superconducting electrical cable located in a utility power network, the method comprising:
   detecting a fault current on the superconducting electric cable;
   determining a cumulative total energy dissipated in the superconducting electrical cable from the fault current and at least one prior fault current over a predetermined time period; and
   determining whether to disconnect the superconducting electrical cable from the utility power network on the basis of said cumulative total energy dissipated.

2. The method of claim 1 wherein the step of detecting includes determining the magnitude of the fault current ($I_j$) and a time duration of the fault current ($t_{dj}$) on the superconducting electrical cable.

3. The method of claim 2 further including determining if the fault current (Ij) exceeds a predetermined threshold current level and if it does disconnecting the superconducting electrical cable from the utility power network for a time period based on the level of the fault current ($I_j$).

4. The method of claim 2 further including determining the time elapsed between the fault current ($I_j$) and a prior fault current ($I_{j-1}$) and determining if the time elapsed exceeds a predetermined threshold time period and if it does, maintaining the connection of the superconducting electrical cable in the utility power network.

5. The method of claim 1 wherein determining whether to disconnect the superconducting electric cable includes determining whether the cumulative total energy value is less than a critical threshold value that represents the amount of energy at which the cable would be damaged if a major fault occurs in a time period that is shorter than a predetermined threshold time period.

6. The method of claim 3 wherein the time period is based on a geometry of the superconducting electrical cable and associated cooling system.

7. The method of claim 6 wherein the geometry of the superconducting electrical cable includes a plurality of layers and the time period is based on ($A_j$), a cross-sectional area of layer (j), ($k_j$), a conductivity of layer (j), ($T_j$), a local temperature of layer (j) which is a function of position within the cable and time, ($R_{j,j-1}$), a thermal resistance between layer (j−1) and layer (j), ($R_{j,j+1}$), a thermal resistance between layer (j) and (j+1), ($\rho_j$), a density of the layer (j), and ($C_j$), a specific heat of layer (j).

8. The method of claim 1 the superconducting electrical cable comprises high temperature superconducting material.

9. The method of claim 8 the electrical cable includes a copper core and a plurality of high temperature superconducting layers separated by electrical insulation.

10. A system for providing protection for a superconducting electrical cable located in a utility power network, the system comprising:
    a sensor configured to detect a fault current carried on the superconducting electrical cable;
    a controller configured to:
       determine the cumulative total energy dissipated in the superconducting electrical cable from the fault current and at least one prior fault current over a predetermined time period; and determine whether to disconnect the superconducting electrical cable from the utility power network on the basis of said cumulative total energy dissipated.

11. The system of claim 10 wherein the controller determines the magnitude of the fault current ($I_j$) and a time duration of the fault current ($t_{dj}$) on the superconducting electrical cable.

12. The system of claim 11 wherein the controller determines if the fault current ($I_j$) exceeds a predetermined threshold current level and if it does disconnects the superconducting electrical cable from the utility power network for a time period based on the level of the fault current ($I_j$).

13. The system of claim 11 wherein the controller determines the time elapsed between the fault current ($I_j$) and a prior fault current ($I_{j-1}$) and determines if the time elapsed exceeds a predetermined threshold time period and if it does, maintaining the connection of the superconducting electrical cable in the utility power network.

14. The system of claim 10 wherein the controller determines whether to disconnect the superconducting electric cable by determining whether the cumulative total energy value is less than a critical threshold value that represents the amount of energy at which the cable would be damaged if a major fault occurs in a time period that is shorter than a predetermined threshold time period.

15. The system of claim 12 wherein the time period is based on the geometry of the superconducting electrical cable and associated cooling system.

16. The system of claim 15 wherein the geometry of the superconducting electrical cable includes a plurality of layers and the time period is based on (Aj), is a cross-sectional area of layer (j), (kj), is a conductivity of layer (j), (Tj), is a local temperature of layer (j) which is a function of position within the cable and time, (Rj,j−1), is a thermal resistance between layer (j−1) and layer (j), (Rj,j+1), is a thermal resistance between layer (j) and (j+1), is a density of the layer (j), and (Cj), is a specific heat of layer (j).

17. The system of claim 10 the superconducting electrical cable comprises high temperature superconducting material.

18. The system of claim 17 the superconducting electrical cable includes a copper core and a plurality of high-temperature superconducting layers separated by electrical insulation.

* * * * *

UNITED STATES PATENT AND TRADEMARK OFFICE
CERTIFICATE OF CORRECTION

PATENT NO. : 7,304,826 B2
APPLICATION NO. : 11/459167
DATED : December 4, 2007
INVENTOR(S) : Yuan et al.

It is certified that error appears in the above-identified patent and that said Letters Patent is hereby corrected as shown below:

Column 6, line 54, the word "threshold" should be removed and the phrase --the threshold of-- should appear after the word "than", so that the beginning of the sentence reads --If the energy per unit length is less than the threshold of 74 J/meter in this example--.

Column 7, line 41, the phrase "the five seconds" should be replaced with the phrase --the 0.4 seconds-- .

Column 7, line 48, the reference "FIG. 4B" should be replaced with the reference --FIG. 5B--.

Column 8, line 53, the word --layer-- should be inserted before "j+1" so that the line reads, in part, --between layer (j) and layer (j+1)--.

Column 8, line 55, the word --wherein-- should be inserted between "1" and "the" so that the line reads, in part, --The method of claim 1 wherein the superconducting electrical--.

Column 8, line 57, the word --wherein-- should be inserted between "8" and "the" so that the line reads --The method of claim 8 wherein the electrical cable includes a--.

Column 9, line 19, the word "maintaining" should be replaced with --maintains--.

Column 10, line 14, the word --layer-- should be inserted before "j+1" so that the line reads, in part, --between layer (j) and layer (j+1)--.

Column 10, line 14, the symbol --(rj),-- should be inserted before the phrase "is a density".

Column 10, line 16, the word --wherein-- should be inserted between "10" and "the" so that the line reads --The system of claim 10 wherein the superconducting electrical--

UNITED STATES PATENT AND TRADEMARK OFFICE
CERTIFICATE OF CORRECTION

| | |
|---|---|
| PATENT NO. | : 7,304,826 B2 |
| APPLICATION NO. | : 11/459167 |
| DATED | : December 4, 2007 |
| INVENTOR(S) | : Yuan et al. |

It is certified that error appears in the above-identified patent and that said Letters Patent is hereby corrected as shown below:

Column 10, line 18, the word --wherein-- should be inserted between "17" and "the" so that the line reads --The system of claim 17 wherein the superconducting electrical--

Signed and Sealed this

Fourth Day of November, 2008

JON W. DUDAS
*Director of the United States Patent and Trademark Office*